(12) United States Patent
Seifi

(10) Patent No.: US 7,735,143 B2
(45) Date of Patent: Jun. 8, 2010

(54) SYSTEM AND METHOD FOR SECURE DOCUMENT PROCESSING

(75) Inventor: Mustafa Seifi, Irvine, CA (US)

(73) Assignees: Toshiba Corporation (JP); Toshiba Tec Kabushiki Kaisha (JP)

(*) Notice: Subject to any disclaimer, the term of this patent is extended or adjusted under 35 U.S.C. 154(b) by 1094 days.

(21) Appl. No.: 10/866,287

(22) Filed: Jun. 12, 2004

(65) Prior Publication Data

US 2006/0020820 A1  Jan. 26, 2006

(51) Int. Cl.
- *H04L 9/32* (2006.01)
- *G06F 12/14* (2006.01)
- *G06F 21/00* (2006.01)
- *G06K 15/02* (2006.01)

(52) U.S. Cl. .......................... 726/28; 726/27; 713/189; 713/193; 358/1.14; 705/51

(58) Field of Classification Search ................. 713/187, 713/189, 193, 194; 726/26–28; 358/1.14; 705/51

See application file for complete search history.

(56) References Cited

U.S. PATENT DOCUMENTS

| | | | |
|---|---|---|---|
| 5,077,795 A * | 12/1991 | Rourke et al. ................. 380/55 |
| 5,323,393 A * | 6/1994 | Barrett et al. ................ 370/449 |
| 5,358,238 A | 10/1994 | Mandel et al. |
| 5,435,544 A | 7/1995 | Mandel |
| 5,633,932 A * | 5/1997 | Davis et al. .................. 713/176 |
| 6,438,574 B1 | 8/2002 | Nagashima |
| 6,658,568 B1 * | 12/2003 | Ginter et al. ................ 713/193 |
| 6,711,677 B1 | 3/2004 | Wiegley |
| 6,762,853 B1 * | 7/2004 | Takagi et al. ................ 358/1.15 |
| 6,952,780 B2 * | 10/2005 | Olsen et al. .................... 726/26 |
| 7,002,707 B2 * | 2/2006 | Kujirai ........................ 358/1.9 |
| 7,082,574 B2 * | 7/2006 | Ogino et al. ................. 715/764 |
| 7,271,925 B2 * | 9/2007 | Nishiyama .................. 358/1.14 |
| 7,284,061 B2 * | 10/2007 | Matsubayashi et al. ..... 709/229 |
| 7,613,412 B2 * | 11/2009 | Harada et al. ................. 399/81 |
| 2002/0032703 A1 | 3/2002 | Gassho et al. |
| 2002/0036790 A1 | 3/2002 | Nishiyama |
| 2002/0120855 A1 | 8/2002 | Wiley et al. |
| 2003/0112452 A1 * | 6/2003 | McIntyre ..................... 358/1.1 |
| 2003/0154383 A9 | 8/2003 | Wiley et al. |
| 2004/0012812 A1 | 1/2004 | Shimizu |
| 2004/0260718 A1 * | 12/2004 | Fedorov ..................... 707/102 |

FOREIGN PATENT DOCUMENTS

JP  2003-25692  1/2003

* cited by examiner

*Primary Examiner*—Zachary A Davis
(74) *Attorney, Agent, or Firm*—Tucker Ellis & West LLP

(57) ABSTRACT

This invention is directed to a system and method for secure document processing. More particularly, this invention is directed to a system and method for secure document processing wherein a user has the ability to confidentially generate or print a document without generating a log entry or other information related to the document.

12 Claims, 4 Drawing Sheets

SYSTEM AND METHOD FOR SECURE DOCUMENT PROCESSING

BACKGROUND OF THE INVENTION

This invention is directed to a system and method for secure document processing. More particularly, this invention is directed to a system and method for secure document processing wherein a user has the ability to confidentially generate or print a document without generating a log entry or other information related to the document.

Typically document processing devices, such as multifunctional peripherals, have the ability to generate documents confidentially or securely. The user selects a private document generation or print option via any suitable means in addition to a personal identification number associated with the document to be printed. Once the document processing device has prepared the document for printing, the user then inputs the personal identification number via any suitable means and the document is then printed. Although the document will only be printed if the user provides the appropriate personal identification number, the document processing device will still log the print job. The log of the document processing device will include the user's name and the printed documents name. There is a need for a system and method which allows for secure document processing and does not generate log information related to such processing.

The subject invention remedies the afore-noted problems and provides a mechanism which allows for secure document processing which does not generate information about the user or the document generated.

SUMMARY OF THE INVENTION

In accordance with the present invention, there is provided a system and method for secure document processing.

Further, in accordance with the present invention, there is provided a system and method for secure document processing without generating log information about the document processing.

Further, in accordance with the present invention, there is provided a system and method which provides a user with the ability to confidentially generate a document using a personal identification number and an alias for the user name and document name.

Still further, in accordance with the present invention, there is provided a system for secure document processing. The system comprises means adapted for receiving electronic document data representative of a document for which a selected process is desired and securing means adapted for securing key data representative of an identifier associated with the electronic document. The system also includes means adapted for communicating the electronic document and the key data to an associated document processing device and means associated with the document processing device adapted for prompting a user for an input relating to the key code. The system further comprises comparison means adapted for comparing the user input with the key data and means adapted for selectively enabling the document processing device in accordance with an output of the comparison means.

In a preferred embodiment, the system further comprises log means adapted for selectively logging operation of the document processing device, means adapted for receiving log enable data, and means adapted for activating the log means in accordance with received log enable data. The system also preferably comprises memory means adapted for spooling the electronic document data and means adapted for selectively overwriting spooled electronic document data in accordance with the log enable data. Preferably, the means for securing key data includes means adapted for securing data representative of a selected alias and a selected identification number.

Preferably, the document processing device is at least one of a printing device, a copying device, facsimile machine, and multifunctional peripheral.

Still further, in accordance with the present invention, there is provided a method for secure document processing. The method comprises the steps of receiving electronic document data representative of a document for which a selected process is desired and securing key data representative of an identifier associated with the electronic document. The method also includes the steps of communicating the electronic document and the key data to an associated document processing device and prompting a user for an input relating to the key code. The method further comprises the steps of comparing the user input with the key data and selectively enabling the document processing device in accordance with an output of the comparison means.

In a preferred embodiment, the method further comprises the steps of selectively logging operation of the document processing device, receiving log enable data, and activating the log means in accordance with received log enable data. The method also preferably comprises the steps of memory spooling the electronic document data and selectively overwriting spooled electronic document data in accordance with the log enable data. Preferably, the step of securing key data includes securing data representative of a selected alias and a selected identification number.

Preferably, the document processing device is at least one of a printing device, a copying device, facsimile machine, and multifunctional peripheral.

Still other objects and aspects of the present invention will become readily apparent to those skilled in this art from the following description wherein there is shown and described a preferred embodiment of this invention, simply by way of illustration of one of the modes best suited for carrying out the invention. As it will be realized, the invention is capable of other different embodiments, and its several details are capable of modifications in various obvious aspects, all without departing from the spirit and scope of the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

This invention is directed to a system and method for secure document processing. More particularly, this invention is directed to a system and method for secure document processing wherein a user has the ability to confidentially generate or print a document without generating a log entry or other information related to the document.

Figure 1:
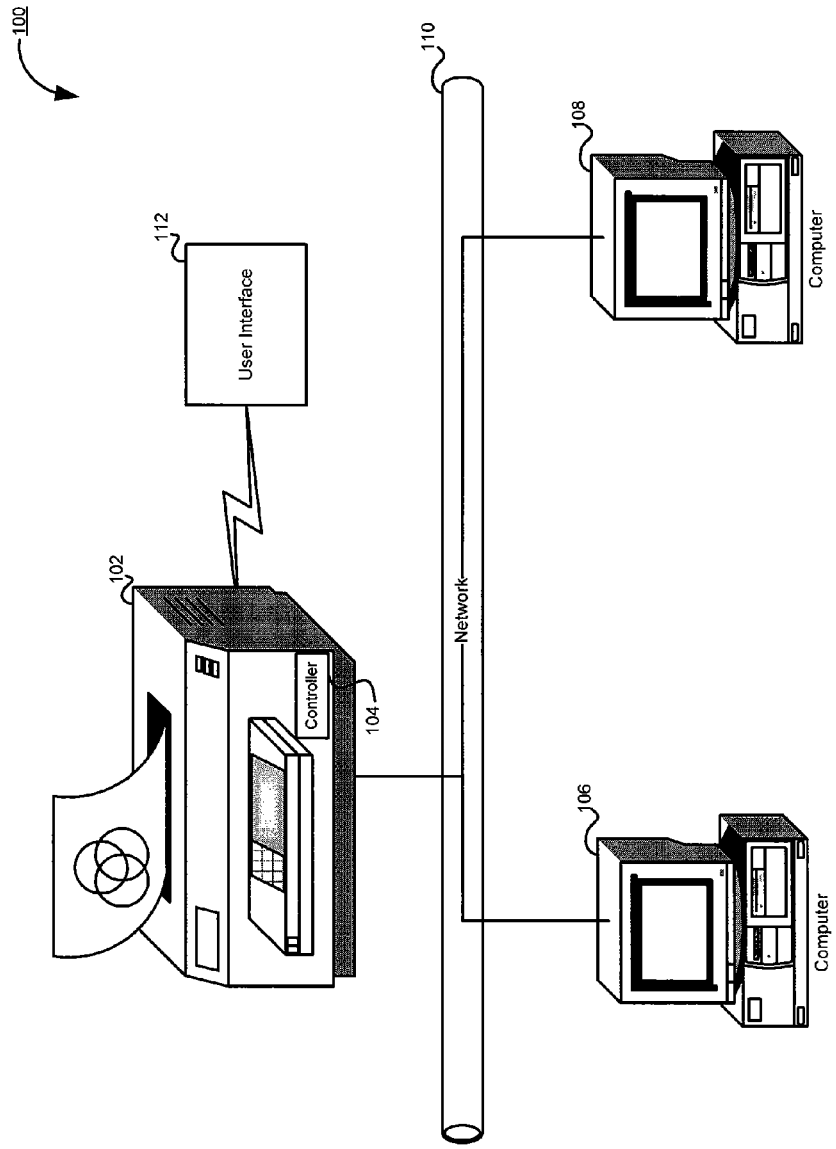
FIG. 1 is a block diagram of the system according to the present invention.

Referring to FIG. 1, there is shown an exemplary system 100 for secure document processing according to the present invention. The system 100 comprises a document processing device 102. The document processing device 102 of system 100 includes a controller 104, typically comprising a processor component, associated memory and a communications component. The controller 104 functions to control the document processing device 102, directing the document processing device 102 operations and enabling communications between the document processing device 102 and other devices. Preferably, the document processing device is a printing device, a copying device, a scanning device, a facsimile, or a multifunctional peripheral.

For example, as shown in FIG. 1, the system 100 resides on a computer network 110, allowing multiple computers 106, 108 to communicate and use the capabilities of the document processing device 102. The network 110 is any suitable network known in the art, for example and without limitation, Ethernet, Token Ring, or the Internet. The computers 106 and 108 transmit data to the document processing device 102 through the controller 104 over the computer network 110. It will be appreciated by those skilled in the art that the document processing device 102 need not be coupled to the computer network 110, but rather preferably may be in a stand-alone mode, i.e. connected to a single computer. The skilled artisan will understand that such a stand-alone configuration will not affect the operation of the present invention with respect thereto. Those skilled in the art will appreciate that the document processing device 102 is suitably any document processing device known in the art, including but not limited, for example, the Toshiba e-Studio Series Controller.

The document processing device is in data communication with an associated user interface 112 by which an associated user requests secure document processing and selects the parameters associated therewith. The user interface preferably includes a display means for displaying information related to secure document processing. In one embodiment, the user interface is a display means or monitor attached to or associated with the document processing device wherein the user uses the interface to access or modify the information about the secure document processing. In another embodiment, the user accesses or modifies such information remotely via a remote user interface, such as via a web administrator, connected to the document processing device via any suitable means. It will be appreciated that viable user interfaces suitably take various forms, such as touch screen, keypads, pen input, and the like.

Figure 2:
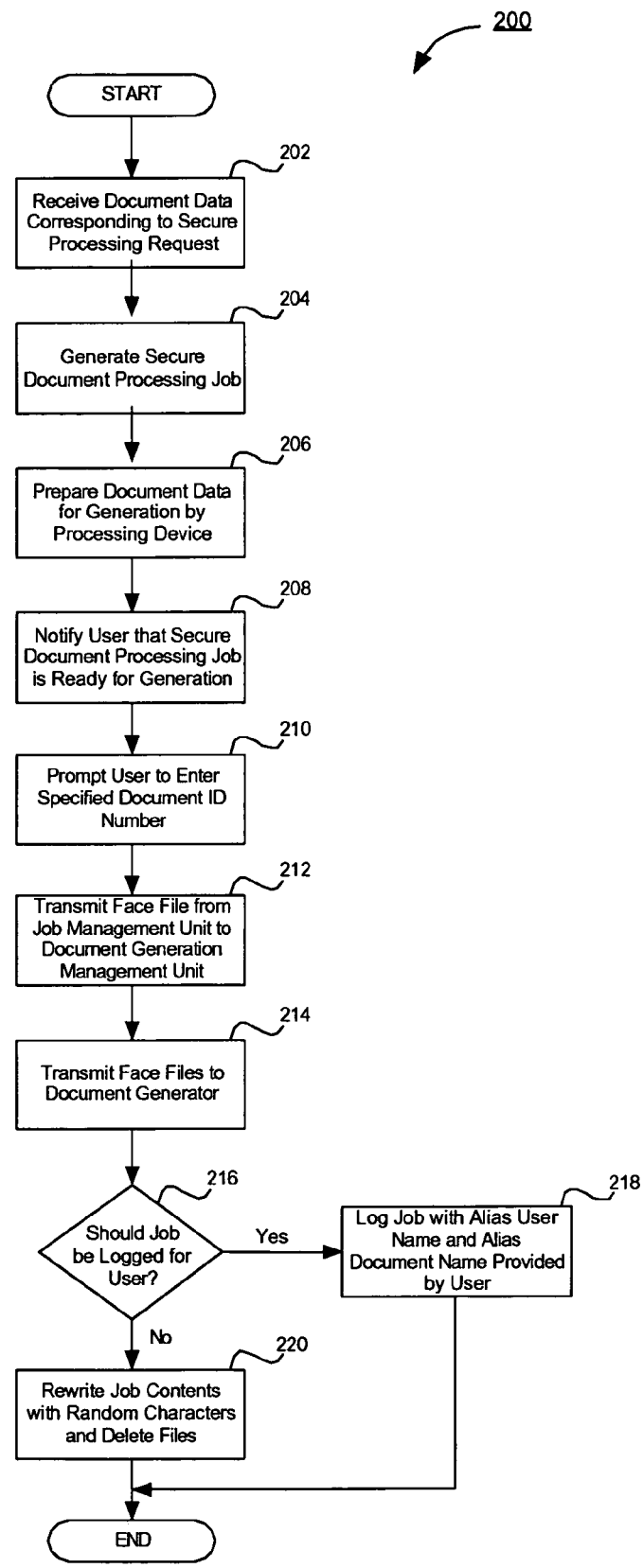
FIG. 2 is a flow chart illustrating the method according to the present invention.

FIG. 2 is a flowchart 200 illustrating the method for secure document processing according to the present invention. At 202, the document data is received at the document processing device via any suitable means. Preferably, the document data is received at a spooling means within the document processing device upon the request from the associated user for generating the document. Preferably, the parameters for generating the document and information related to the secure document processing are also transmitted to the document processing device.

Figure 3:
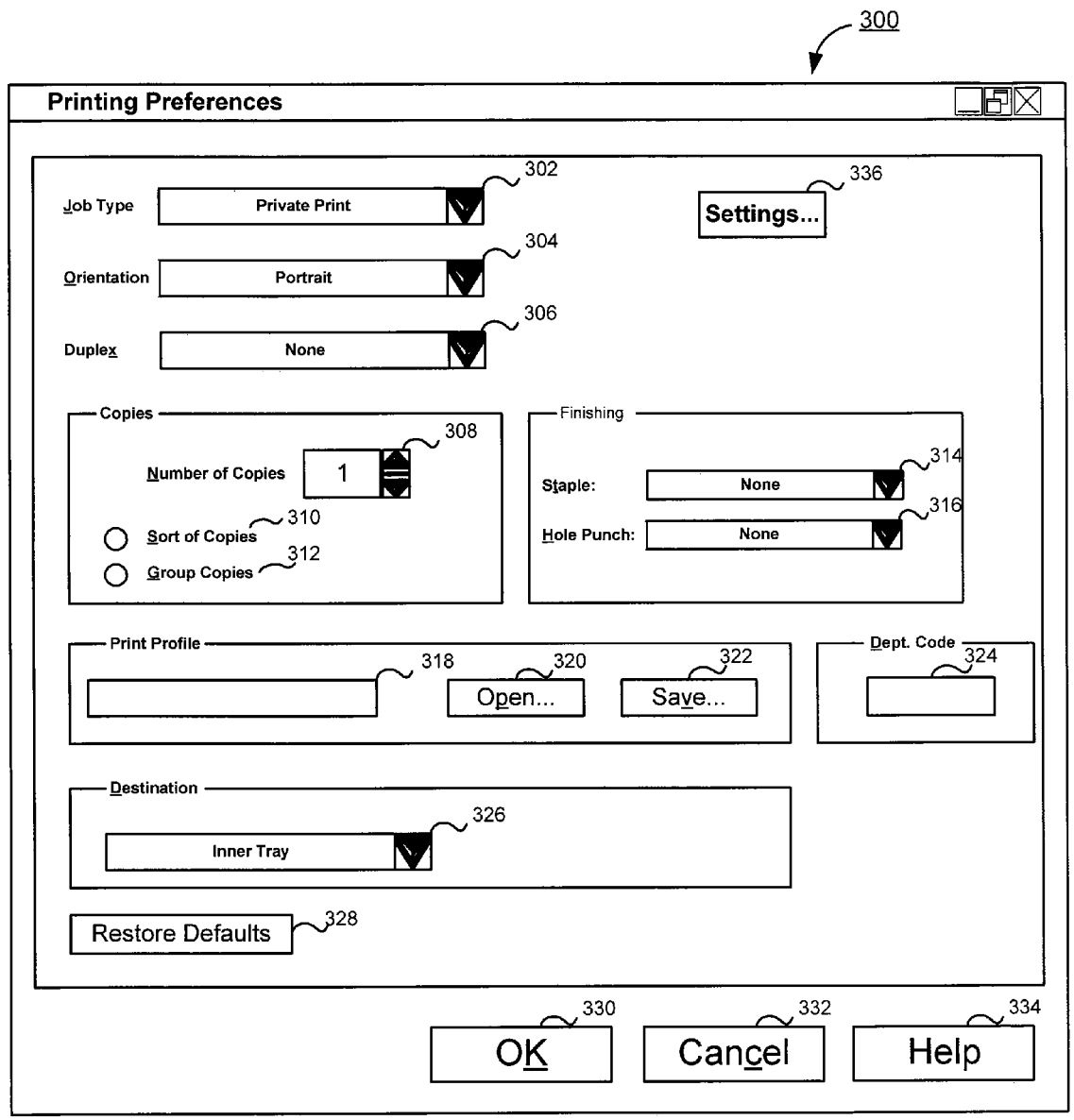
FIG. 3 is a sample template for selecting the parameters for the secure document processing.

FIG. 3 illustrates a user interface display 300 for selecting the parameters for the document generation and the secure document processing option. At 302, the user selects the job type, such as private print. At 304, the user selects the orientation of the document to be generated. At 306, the user selects the duplexing option. The user then selects the number of copies at 308, whether the copies are to be sorted at 310, and the grouping of the copies at 312. The user selects the finishing options by selecting the stapling option 314 and/or the hole punch option at 316.

At 318, the user inputs the print profile. The user is able to open print profiles by selecting the Open button 320 or save the print profile by selecting the Save button 322. The user enters the department code for the department for which the document is to be generated at 324. The user then selects the destination at 326.

The user has the option to restore default settings at 328. The user saves the information by selecting the OK button 330 or cancels the information by selecting the Cancel button 332. The user requests help for completing the information by selecting the Help button 334.

The user selects the secure document processing option by selecting the Settings button 336. The user is then presented with a screen for selecting the secure document processing and the parameters associated therewith.

Figure 4:
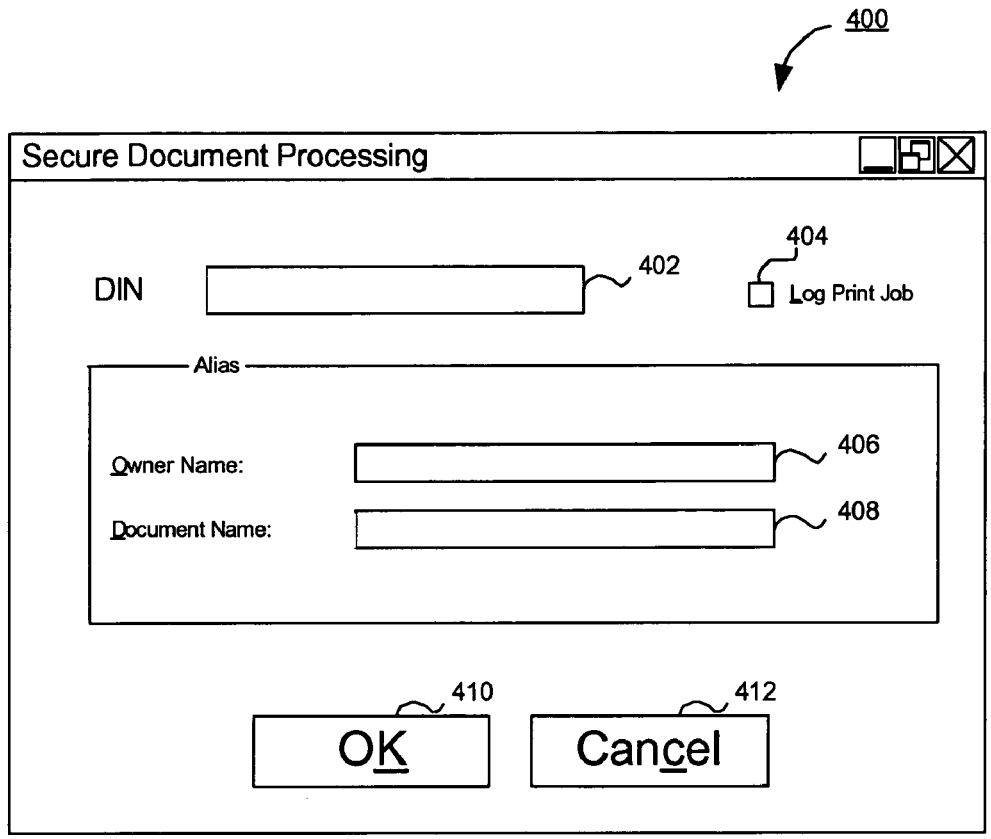
FIG. 4 is a sample template for selecting the document identification number and alias assigned to the secure document processing job.

FIG. 4 is a user interface display 400 for selecting the parameters for the secure document processing. At 402, the user provides or is provided the document identification number. The document identification number is selected by the user or is generated by the system via any suitable means and provided to the user. At 404, the user selects if the processing job is to be logged. The user enters an alias for the user name at 406 and an alias for the document name at 408. The alias user name and the document name are logged instead of the actual user name and document name. If the user desires to save the information, the user selects the OK button at 410. If the user does not want to save the information, the user selects the Cancel button 412. The information provided by the user is stored in a suitable storage medium for later use in the secure document processing operation.

In one embodiment, the user enters the requested information via the user interface attached to or associated with the document processing device wherein the user uses the interface to access or modify the information about the secure document processing. In another embodiment, the user enters the requested information remotely via a remote user interface, such as via a web administrator, connected to the document processing device via any suitable means.

At 204, the document processing job is created via any suitable means. Preferably, the document processing job is created by job managing means within the controller in the document processing device. At 206, the document file is prepared for generating via any suitable means. Preferably, the document file is rasterized by a RIP manager means within the document processing device.

At 208, the user requesting the secure document processing job is notified that the job is ready to be generated via any suitable means.

At 210, upon notification to the user, the user is prompted to enter a specified document identification number via any suitable means in order for the document to be generated. In one embodiment, the user enters the requested information via the user interface attached to or associated with the document processing device wherein the user uses the interface to access or modify the information about the secure document processing. In another embodiment, the user enters the requested information remotely via a remote user interface, such as via a web administrator, connected to the document processing device via any suitable means.

Once the user has entered the correct document identification number, flow proceeds to 212 wherein the job management means transmits a face file to the document generation management means. At 214, the generated face files are then sent to be generated via any suitable means.

At 216, once the job is generated, the system determines if the document processing job is to be logged by checking the information provided by the user by any suitable means. If the document processing job is to be logged, then the document processing job is logged using the alias user name and alias document name provided by the user as shown at 218. If the document processing job is not to be logged, then the system suitably rewrites the contents of the job with random characters by any suitable means and then deletes the file as shown at 220. A degree of overwriting is suitably tailored to the level of privacy desired. By way of example, certain security applications may be masked commensurate with U.S. Department of Defense standards (currently DOD 5220.22-M, *"National Industrial Security Program Operating Manual (NISPOM),"* January 1995), as well as other selected standards as might be applicable to the specific situation.

While in the preferred embodiment the present invention is implemented in software, those skilled in the art can readily appreciate that the present invention may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for secure document processing comprising:

memory means adapted for receiving, into a data storage associated with a document processing device, electronic document data representative of a document for which a selected document rendering process is desired;

means adapted for prompting an associated user for a user-selected alias and user-selected identification code corresponding to an identity of the document;

securing means adapted for securing key data representative of an identifier associated with the electronic document, the key data corresponding to the user-selected alias and the user-selected identification code;

means adapted for communicating the electronic document and the key data to the associated document processing device;

means associated with the document processing device adapted for prompting the user for an input relating to the key data;

comparison means adapted for comparing the user input with the key data;

means adapted for selectively enabling the document processing device to perform the selected document rendering process in accordance with an output of the comparison means;

means adapted for receiving a logging instruction from the associated user, the logging instruction indicative of at least one of the group consisting of the selected document rendering process being a confidential document processing operation so as to preclude logging thereof and the selected document rendering process not being a confidential document processing operation, indicative of an approved logging operation;

log means adapted for selectively logging operation of the document processing device in accordance with the user-selected alias and user-selected identification code if the received logging instruction is indicative of an approved logging operation;

means adapted for generating job data on a display associated with the document processing device corresponding to the selected document rendering process and the electronic document data, wherein the job data references the user-selected alias as the sole indicator as to an identity of the associated user and a user-selected identification code as a sole indicator of an identity of the electronic document;

means adapted for activating the log means in accordance with the received logging instruction indicative of the approved logging operation;

overwriting means adapted for selectively overwriting, a plurality of times with random characters, memory locations of the data storage used in connection with storage of the electronic document used in performing the selected document rendering process in accordance with the received logging instruction indicating that the selected document rendering process is a confidential document processing operation; and means adapted for deleting the electronic document after completion of the overwriting so as to free the storage location thereafter.

2. The system for secure document processing of claim 1 wherein the document processing device is at least one of a printing device, a copying device, facsimile machine, and multifunctional peripheral.

3. The system for secure document processing of claim 1 further comprising means adapted for receiving user parameter selection data, wherein the user parameter selection data is data representative of output parameters for the document processing.

4. The system for secure document processing of claim 3 wherein the means adapted for prompting a user via an associated user interface of a document processing device for an input relating to the key data, the means adapted for receiving log enable data, and the wherein the means adapted for receiving user parameter selection data includes an associated user interface.

5. A method for secure document processing comprising the steps of:

receiving, into the data storage associated with a document processing device having a processor and data storage associated therewith, electronic document data representative of a document for which a selected document rendering process is desired;

prompting an associated user for a user-selected alias and user-selected identification code corresponding to an identity of the document;

securing key data representative of an identifier associated with the electronic document, the key data including data representative of the user-selected alias and the user selected identification code;

communicating the electronic document and the key data to the associated document processing device;

prompting the user for an input relating to the key data;

comparing the user input with the key data;

selectively enabling the document processing device to perform the selected document rendering process in accordance with an output of the comparison;

receiving a logging instruction from the associated user, the logging instruction indicative of at least one of the group consisting of the selected document rendering process being a confidential document processing operation so as to preclude logging thereof and the selected document rendering process not being a confidential document processing operation, indicative of an approved logging operation;

selectively logging operation of the document processing device in accordance with the user-selected alias and user-selected identification code if the received logging instruction is indicative of an approved logging operation;

generating job data on a display associated with the document processing device corresponding to the selected document rendering process and the electronic document data, wherein the job data references the user-selected alias as the sole indicators as to an identity of the associated user and a user-selected identification code as a sole indicator of an identity of the electronic document;

activating the logging operation in accordance with the received logging instruction indicative of the approved logging operation;

selectively overwriting, a plurality of times with random characters, memory locations of the data storage used in connection with storage of the electronic document used in performing the selected document rendering process in accordance with received logging instruction indicating that the selected document rendering process is a confidential document processing operation; and deleting the electronic document after completion of the overwriting so as to free the storage location thereafter.

6. The method for secure document processing of claim 5 wherein the document processing device is at least one of a printing device, a copying device, facsimile machine, and multifunctional peripheral.

7. The method for secure document processing of claim 5 further comprising the step of receiving user parameter selection data, wherein the user parameter selection data is data representative of output parameters for the document processing.

8. The method for secure document processing of claim 7 wherein prompting a user for an input relating to the key data, receiving log enable data, and receiving user parameter selection data are performed via an associated user interface.

9. A system for secure document processing comprising:

an input operable for receiving, into the data storage associated with a document processing device having a processor and data storage associated therewith, electronic document data representative of a document for which a selected document rendering process is desired;

a processor operable for prompting an associated user for a user-selected alias and user-selected identification code corresponding to an identity of the document;

the processor further operable for securing key data representative of an identifier associated with the electronic document, the key data including data representative of the user-selected alias and the user selected identification code;

an output operable for communicating the electronic document and the key data to the associated document processing device;

the processor further operable for prompting the user for an input relating to the key data;

the processor further operable for comparing the user input with the key data;

the processor further operable for selectively enabling the document processing device to perform the selected document rendering process in accordance with an output of the comparison;

an input operable for receiving a logging instruction from the associated user, the logging instruction indicative of at least one of the group consisting of the selected document rendering process being a confidential document processing operation so as to preclude logging thereof and the selected document rendering process not being a confidential document processing operation, indicative of an approved logging operation;

the processor further operable for selectively logging operation of the document processing device in accordance with the user-selected alias and user-selected identification code if the received logging instruction is indicative of an approved logging operation;

the processor further operable for generating job data on a display associated with the document processing device corresponding to the selected document rendering process and the electronic document data, wherein the job data references the user-selected alias as the sole indicators as to an identity of the associated user and a user-selected identification code as a sole indicator of an identity of the electronic document;

the processor further operable for activating the logging operation in accordance with the received logging instruction indicative of the approved logging operation;

the processor further operable for selectively overwriting, a plurality of times with random characters, memory locations of the data storage used in connection with storage of the electronic document used in performing the selected document rendering process in accordance with received logging instruction indicating that the selected document rendering process is a confidential document processing operation; and the processor further operable for deleting the electronic document after completion of the overwriting so as to free the storage location thereafter.

10. The system for secure document processing of claim 9 wherein the document processing device is at least one of a printing device, a copying device, facsimile machine, and multifunctional peripheral.

11. The system for secure document processing of claim 9 further comprising an input operable for receiving user parameter selection data, wherein the user parameter selection data is data representative of output parameters for the document processing.

12. The system for secure document processing of claim 11 wherein prompting a user for an input relating to the key data, receiving log enable data, and receiving user parameter selection data are performed via an associated user interface.

* * * * *